May 11, 1926.
C. P. WHITTENBERG
CRUDE OIL BURNER
Filed June 13, 1924
1,584,001
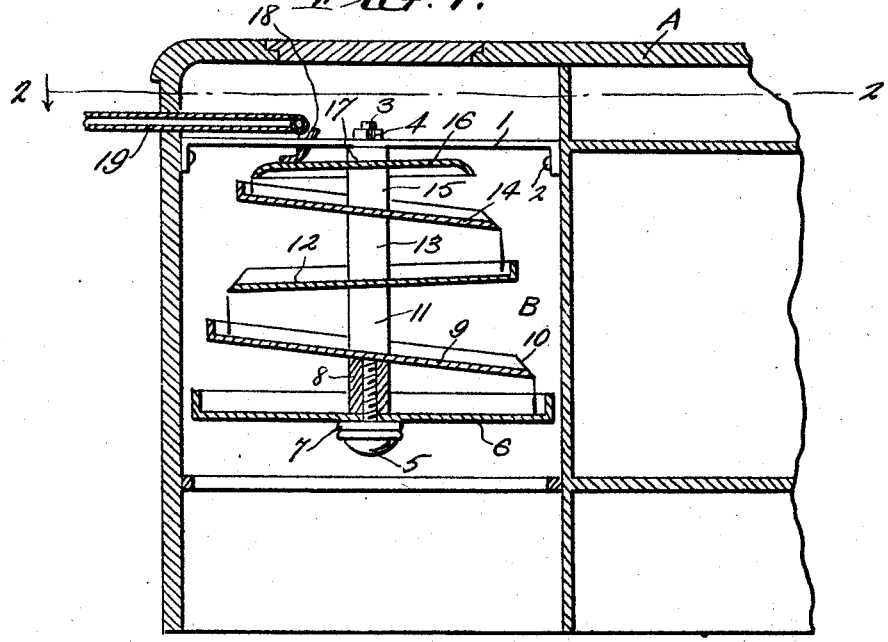
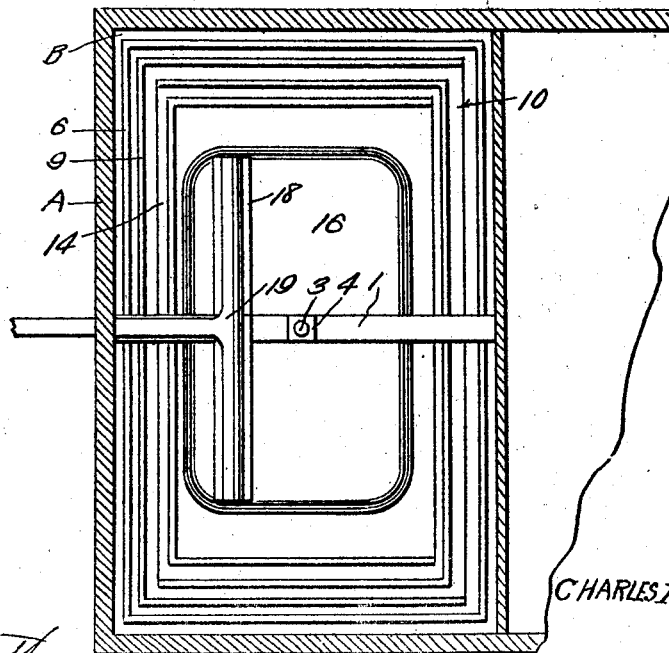
Inventor
CHARLES P. WHITTENBER
By Richard B. Owen
Attorney
Witnesses:

Patented May 11, 1926.

1,584,001

UNITED STATES PATENT OFFICE.

CHARLES P. WHITTENBERG, OF ELK CITY, OKLAHOMA.

CRUDE-OIL BURNER.

Application filed June 13, 1924. Serial No. 719,898.

The present invention appertains to oil burners and has for its prime object to generally improve upon their structure.

An important object of the invention is to provide a device of this nature possessed of a very simple and efficient construction, one which is reliable in use, inexpensive to manufacture, strong, durable, and well adapted to the purpose for which it is designed.

A still further important object of the invention is to provide a device of this nature which may be easily inserted in a fire box of an ordinary coal stove.

With the above and numerous other objects in view as will appear as the description progresses, the invention resides in certain novel features of construction, and in the combination and arrangement of parts as will be hereinafter more fully described and claimed.

In the drawing:

Figure 1 is a vertical sectional view taken through an ordinary kitchen range showing my invention in section disposed in the fire box thereof, and Figure 2 is a horizontal section therethrough taken substantially on the line 2—2 of Figure 1 looking downwardly.

Referring to the drawing in detail it will be seen that A designates an ordinary kitchen range provided with the usual firebox B in which is adapted to be positioned my improved oil burner.

A hanger rod 1 is fixed into the firebox adjacent the upper end thereof so as to be horizontally disposed being riveted or otherwise fastened as at 2 to the side walls of the fire box. A bolt 3 vertically disposed centrally of the fire box passes through the rod 1 and is held in place by nut 4. This bolt depends from the rod 1 the head side thereof being adjacent the bottom of the firebox. A bottom pan 6 is supported horizontally on the bolt, said bolt passing centrally therethrough so that the pan rests on washers 7 which in turn rests on the head 5 of the bolt. A spacing element in the form of a sleeve indicated at 8 is then placed on the bolt so as to rest on the bottom of the pan 6. The upper end of this spacing sleeve 8 is beveled so that pan 9 may rest thereon, the bolt 3 passing therethrough. This pan 9 is thus disposed in an inclined position and has one end 10 thereof open. The pan 9 is smaller in area than pan 6 and thus will drain into pan 6. A spacing sleeve 11 is disposed on the bolt and has its ends oppositely beveled, the lower end resting on the bottom of pan 9. A pan 12 is disposed on the bolt so as to rest on the upper end of the spacing sleeve 11 and is inclined oppositely from pan 9 being of identical structure with pan 9 except smaller in area and the open end being oppositely disposed in respect to the open end 10 of the pan so that oil may drain from pan 12 into pan 9. A sleeve 13 having its ends beveled is disposed on the bolt so as to rest on the bottom of pan 12 and support a pan 14 disposed on the bolt and inclined oppositely from pan 12 but of similar construction therewith having its open end adjacent open end 10 of pan 9.

A sleeve 15 is disposed about the bolt 3 resting on pan 14. This sleeve has its end oppositely beveled and supports a dome 16 which is of an inverted saucer shape formation and smaller in area than pan 14 and being inclined opposite thereto. A spacer sleeve 17 is disposed between this dome 16 and the hanger rod 1. A guide cup 18 is fixed to the upper surface of the dome 16 adjacent its lower portion and a fuel pipe 19 extends into the firebox B so as to terminate above this guide cup 18. In assembling the device, of course, the various pans and space sleeves are first positioned on the bolt and then the bolt is engaged with the hanger bar 1 which is then riveted or otherwise fastened in place in the firebox B.

In starting the fire with this burner sufficient oil is allowed to pass through the fuel line 19 until the bottom pan 6 is practically full. The path of the oil may easily be followed from the drawing as it will pass over the guide cup 18 and drain into the pan 14, from there drain into pan 12, from there drain into pan 9, from there drain into the bottom pan 6. The oil in this bottom pan is then lighted which will cause the upper pan to become heated and the oil is slowly fed thereto so that an exceptionally hot flame is produced.

It is to be noted that there is sufficient space between the various pans to allow a sufficient circulation of air.

It is evident that the changes in the details of construction, and in the combination and arrangement of parts may be resorted to without departing from the spirit or scope of the invention as hereinafter claimed or sacrificing any of its advantages.

Having thus described my invention, what I claim as new is:

1. A burner comprising a horizontally arranged pan, a plurality of angularly arranged pans supported above the horizontal pan, such angularly disposed pans being arranged in staggered relation, a dome arranged above the uppermost angularly disposed pan, and a common fastening means for securing all of the pans and the dome together, and such fastening means also serving as means for attaching the device to a horizontal support.

2. An oil burner comprising a horizontally arranged pan, a plurality of pans arranged in vertical staggered relation and each having one end arranged to discharge liquid fuel onto the pan next in order, a plurality of vertically aligned spacer sleeves arranged between the pans, and a bolt passing through the sleeves and pans, and a dome carried by the upper end of such bolts and overlying the uppermost pan.

3. An oil burner comprising a horizontally arranged pan, a plurality of pans arranged in vertical staggered relation and each having one end arranged to discharge liquid fuel onto the pan next in order, a plurality of vertically aligned sleeves arranged between the pans, and a bolt passing through the sleeves and pans, and a dome carried by the upper end of said bolt and overlying the uppermost pan, and means for distributing liquid fuel throughout the length of the dome so that the latter will gravitate successively over the staggered pans and be caught by the horizontal pan.

In testimony whereof I affix my signature.

CHARLES P. WHITTENBERG.